US 12,039,745 B2

(12) United States Patent
Boilevin Kayl et al.

(10) Patent No.: US 12,039,745 B2
(45) Date of Patent: Jul. 16, 2024

(54) METHOD AND SYSTEMS FOR REMOVING ANTI-SCATTER GRID ARTIFACTS IN X-RAY IMAGING

(71) Applicant: GE Precision Healthcare LLC, Milwaukee, WI (US)

(72) Inventors: Ludovic Boilevin Kayl, Versailles (FR); Fabio Mattana, Versailles (FR); Vincent Jonas Bismuth, Paris (FR); Romain Brevet, Versailles (FR); Fanny Patoureaux, Beynes (FR)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 397 days.

(21) Appl. No.: 17/443,810

(22) Filed: Jul. 27, 2021

(65) Prior Publication Data
US 2023/0030175 A1    Feb. 2, 2023

(51) Int. Cl.
*G06T 5/70*    (2024.01)
*G06T 5/50*    (2006.01)
(Continued)

(52) U.S. Cl.
CPC .............. *G06T 7/37* (2017.01); *G06T 7/0012* (2013.01); *G06T 7/11* (2017.01); *G21K 1/025* (2013.01); *G06T 2207/10116* (2013.01); *G06T 2207/30068* (2013.01); *G06T 2207/30112* (2013.01); *G06T 2207/30242* (2013.01)

(58) Field of Classification Search
CPC . G06T 7/37; G06T 7/0012; G06T 7/11; G06T 2207/10116; G06T 2207/30068; G06T 2207/30112; G06T 2207/30242; G21K 1/025
See application file for complete search history.

(56) References Cited

U.S. PATENT DOCUMENTS 6,157,700 A     12/2000  Sako
6,285,781 B1 *   9/2001  Yamazaki ................. G06T 5/50
                                             382/132
(Continued)

FOREIGN PATENT DOCUMENTS

CN        104574288 A       4/2015
DE     102013223392 A1      9/2014
(Continued)

OTHER PUBLICATIONS

EP application 22184508.4 filed Jul. 12, 2022—extended Search Report issued Jan. 5, 2023, 9 pages.
(Continued)

*Primary Examiner* — Bobbak Safaipour
*Assistant Examiner* — Ashley L. Hytrek
(74) *Attorney, Agent, or Firm* — McCoy Russell LLP

(57) ABSTRACT

Various methods and systems are provided for x-ray imaging. In one embodiment, a method includes acquiring, with an x-ray detector, an x-ray image of a subject, determining a transformation that minimizes anti-scatter grid artifacts in the x-ray image, correcting the x-ray image according to the transformation to generate a corrected image, and outputting the corrected image. In this way, artifacts arising from a misalignment of an anti-scatter grid between the calibration and the acquisition may be reduced.

15 Claims, 7 Drawing Sheets

(51) Int. Cl.
  *G06T 7/00*    (2017.01)
  *G06T 7/11*    (2017.01)
  *G06T 7/37*    (2017.01)
  *G21K 1/02*    (2006.01)

(56) References Cited

U.S. PATENT DOCUMENTS

| | | | |
|---|---|---|---|
| 6,333,990 B1 | 12/2001 | Yazici et al. | |
| 6,542,575 B1 | 4/2003 | Schubert et al. | |
| 7,147,373 B2 | 12/2006 | Cho et al. | |
| 7,920,672 B2* | 4/2011 | Timmer | A61B 6/5282 378/207 |
| 8,494,118 B2* | 7/2013 | Oikawa | A61B 6/4291 378/207 |
| 8,712,715 B2 | 4/2014 | Tonami | |
| 9,119,593 B2 | 9/2015 | Ren et al. | |
| 9,636,079 B2 | 5/2017 | Bredno et al. | |
| 10,159,452 B2* | 12/2018 | Bernhardt | A61B 6/5252 |
| 10,206,650 B2 | 2/2019 | Rozas et al. | |
| 10,327,727 B2* | 6/2019 | Maslowski | G06T 5/00 |
| 2003/0152259 A1 | 8/2003 | Belykh et al. | |
| 2007/0172033 A1 | 7/2007 | Gorges et al. | |
| 2008/0186311 A1 | 8/2008 | Claus | |
| 2011/0200169 A1 | 8/2011 | Oikawa | |
| 2013/0148786 A1 | 6/2013 | Kruschel et al. | |
| 2022/0042932 A1* | 2/2022 | Sun | G01T 1/2985 |

FOREIGN PATENT DOCUMENTS

| | | | |
|---|---|---|---|
| DE | 102016206559 B3 | 6/2017 | |
| EP | 0962888 A2 | 12/1999 | |
| EP | 1505540 A2 | 2/2005 | |
| EP | 0867835 B1 | 1/2007 | |
| EP | 3427664 A1 | 1/2019 | |
| JP | 2002033960 A | 1/2002 | |
| JP | 2002336220 A * | 11/2002 | A61B 6/06 |
| JP | 2002336220 A | 11/2002 | |
| JP | 2011167334 A | 9/2011 | |

OTHER PUBLICATIONS

JP 2002336220 English Abstract obtained from Espacenet.com; 1 page.
JP application 2022-111582 filed Jul. 12, 2022—Office Action issued Jul. 12, 2023; Machine Translation; 5 pages.
JP application 2022-111582 filed Jul. 12, 2022—Office Action issued Dec. 13, 2023, Machine Translation, 4 pages.
JP2002-033960 English Abstract, Espacenet.com search Mar. 12, 2024; 1 page.

* cited by examiner

METHOD AND SYSTEMS FOR REMOVING ANTI-SCATTER GRID ARTIFACTS IN X-RAY IMAGING

FIELD

Embodiments of the subject matter disclosed herein relate to x-ray imaging.

BACKGROUND

Imaging technologies such as x-ray imaging allow for non-invasive acquisition of images of internal structures or features of a subject or an object. Digital x-ray imaging systems produce digital data which can be reconstructed into radiographic images. In digital x-ray imaging systems, radiation from a source is directed toward the subject in a medical application, a package or baggage in a security screening application, or a fabricated component in an industrial quality control inspection application. A portion of the radiation passes through the subject/object and impacts a detector. The detector includes an array of discrete detector elements (DELs) or pixels and generates output signals based upon the quantity or intensity of the radiation impacting each detector element region. The output signals are subsequently stored in picture elements (pixels) and processed to generate an image that may be displayed for review. These images are used to identify and/or examine the internal structures and organs within a patient's body, objects within a package or container, or defects such as cracks within a fabricated component.

BRIEF DESCRIPTION

In one embodiment, a method comprises acquiring, with an x-ray detector, an x-ray image of a subject, determining a transformation that minimizes anti-scatter grid artifacts in the x-ray image, correcting the x-ray image according to the transformation to generate a corrected image, and outputting the corrected image. In this way, artifacts arising from a misalignment of the anti-scatter grid between the calibration and the acquisition may be reduced.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 2:
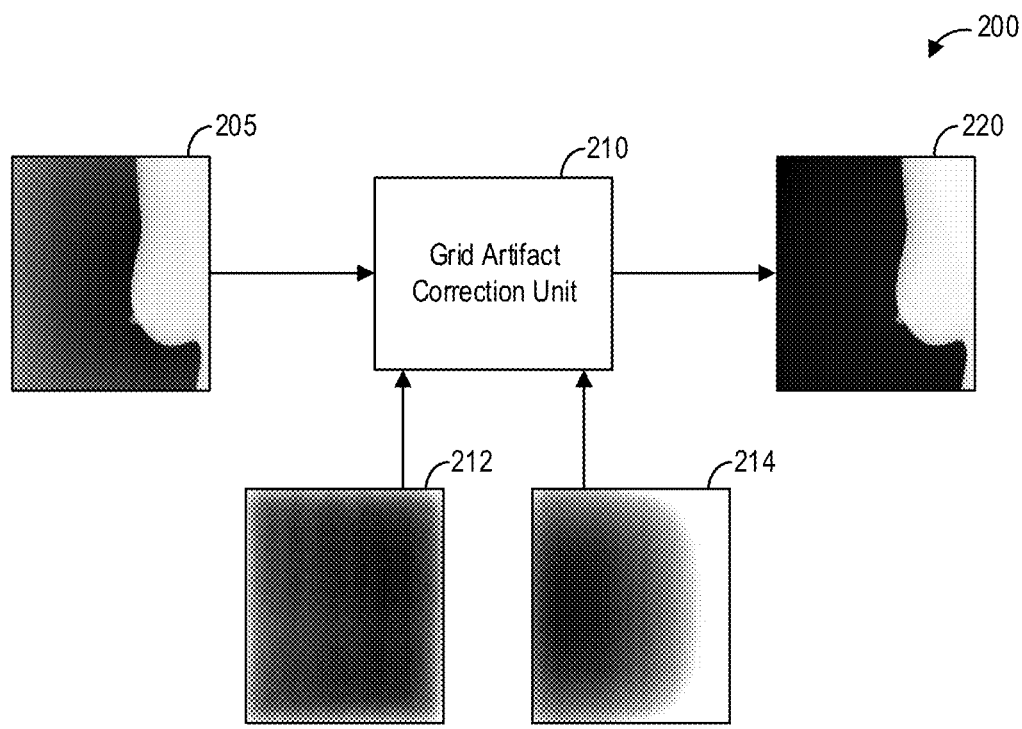
FIG. 2 shows a block diagram illustrating an example method for correcting grid artifacts caused by an anti-scatter grid according to an embodiment.
Figure 3:
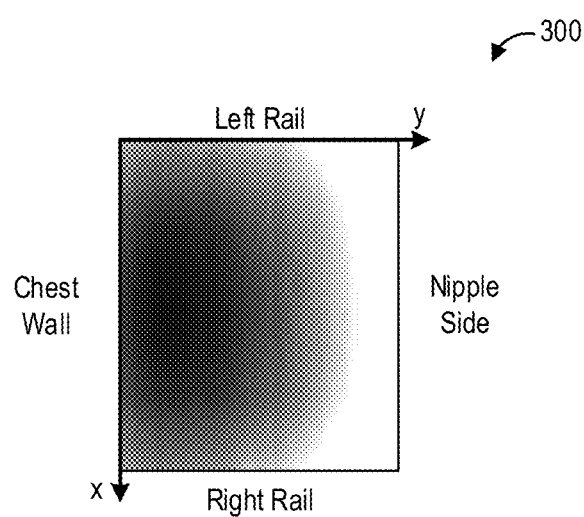
FIG. 3 shows a diagram illustrating an example orientation of an anti-scatter grid relative to imaged anatomy according to an embodiment.
Figure 4:
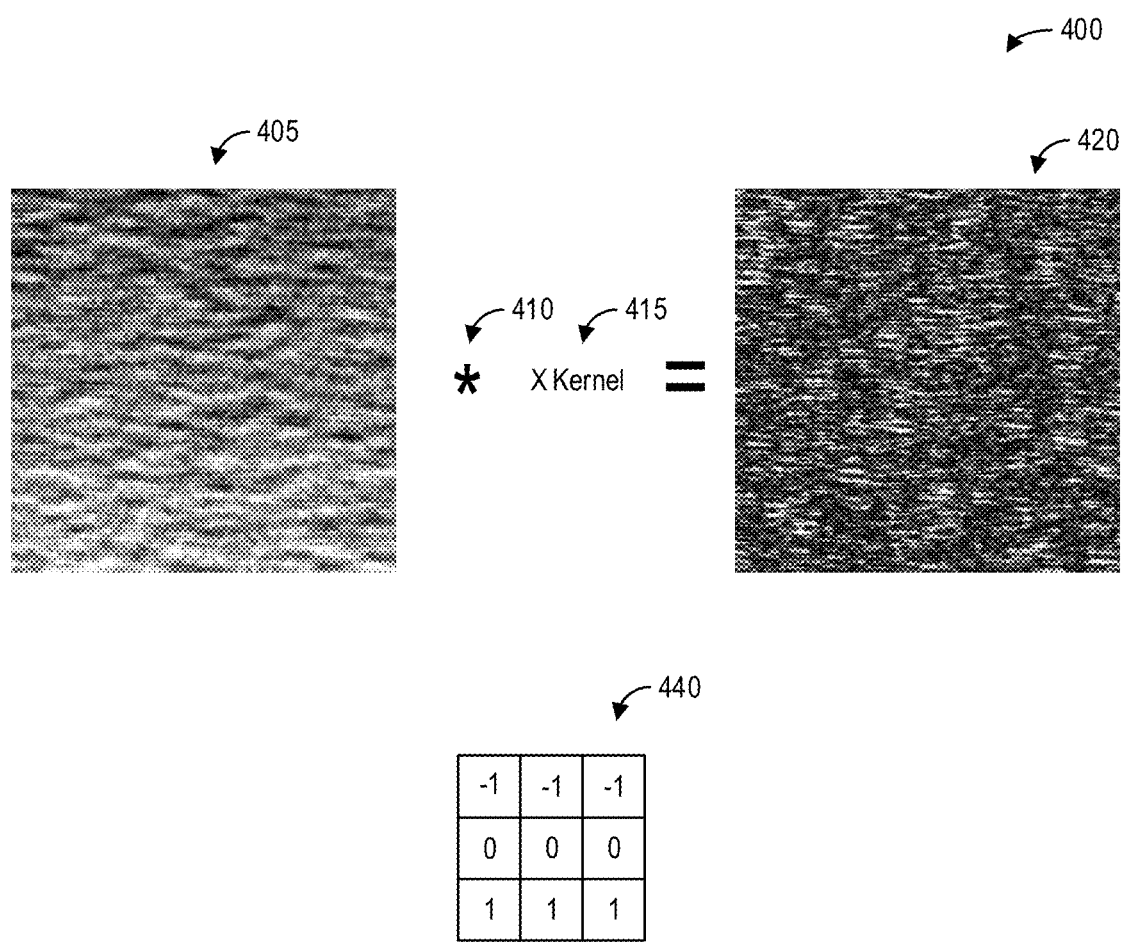
FIG. 4 shows a block diagram illustrating an example evaluation of an acquisition with horizontal artifacts to quantify an amount of artifact according to an embodiment.
Figure 5:
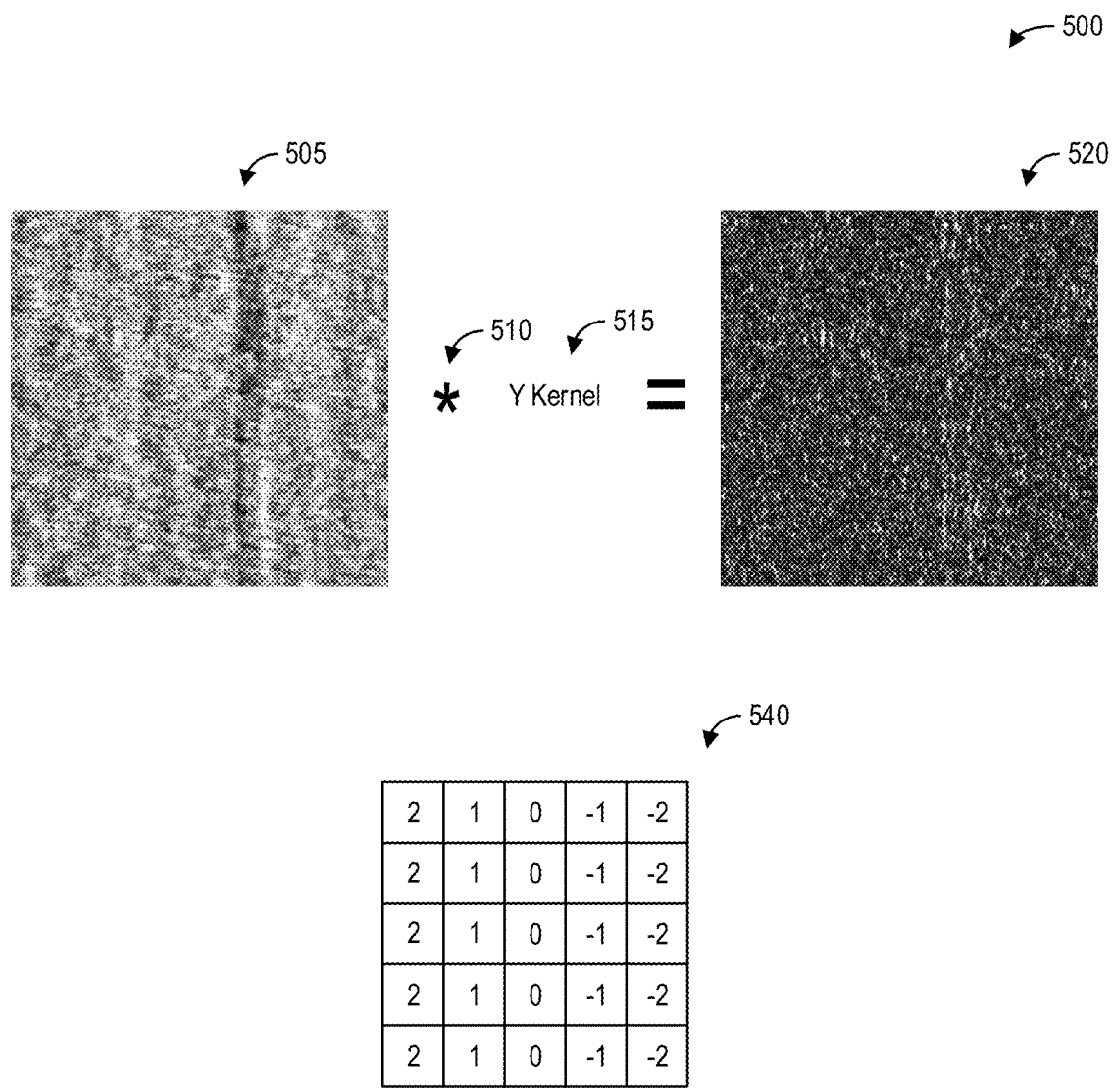
FIG. 5 shows a block diagram illustrating an example evaluation of an acquisition with vertical artifacts to quantify an amount of artifact according to an embodiment.

The following description relates to various embodiments of x-ray imaging. In particular, systems and methods for removing grid artifacts in x-ray imaging are provided. An x-ray imaging system, such as the x-ray imaging system depicted in FIG. 1, includes an x-ray detector which may be positioned relative to an x-ray source. The x-rays after crossing a patient are split into primary radiation, conveying most of the information, and scatter radiation, mostly conveying very little information, decreasing contrast and contributing to noise. The x-ray imaging system includes an anti-scatter grid positioned adjacent to the detecting surface of the x-ray detector to prevent scatter radiation from reaching the x-ray detector. By reducing the detection of scattered radiation via an anti-scatter grid, also referred to herein as a grid, image quality may be improved. Anti-scatter grids may further partially absorb primary radiation and consequently become visible in acquired images. This phenomenon may be corrected through the use of gain maps obtained by gain calibration. The gain correction is the correction of all fixed patterns introduced in the image by the components of the imaging system through a reference image presenting the same patterns; other terms, such as shadowing or flat fielding, may be used to indicate the same correction. As part of the image systems, patterns introduced by the anti-scatter grid may be corrected by gain maps. However, if the position of the anti-scatter grid relative to the x-ray detector during x-ray imaging is not the same as the position of the anti-scatter grid relative to the x-ray detector during gain calibration, various grid artifacts can appear on the acquired image despite correction with gain maps. In order to correct such grid artifacts in acquired images, a grid artifact correction unit, as depicted in FIG. 2, uses an initial gain map acquired with the grid and an initial gain map acquired without the grid to generate a corrected image. For example, the initial image of the grid, obtained by dividing the gain map with grid by the gain map without grid, may be geometrically transformed according to a plurality of transformations, corresponding to translations in a plane parallel to the detector surface, as depicted in FIG. 3, though it should be appreciated that other transformations such as rotational transformations relative to the plane of the detector surface may be applied to the initial image of the grid, or any form of geometric transformation (including non-linear ones). Such transformations correspond to displacements or deformations of the projection of the anti-scatter grid relative to the x-ray detector or displacements of the x-ray source relative to the x-ray detector. The amount of artifacts may be quantified by evaluating the acquired image with different image processing techniques, as depicted in FIGS. 4 and 5. The transformed images of the grid and the initial gain map without grid are then used to generate a plurality of transformed gain maps with grid, which in turn are used to generate a plurality of corrected images. A method for correcting grid artifacts in x-ray images, such as the method shown in FIG. 6, thus includes generating a plurality of corrected images with a plurality of transformed gain maps, and using a metric on the corresponding corrected image to evaluate which transformed gain map provided the best reduction in grid artifacts. The corrected image with the best reduction in grid artifacts is output as the corrected image. As the transformed gain maps are obtained based on a plurality of transformations, as depicted in FIG. 7, the transformed gain map that provides the best reduction in grid artifacts indicates the deviation of the anti-scatter grid from the original position, via the particular transformation used to obtain the transformed gain map. This optimization problem may be solved by any suitable optimization technique (e.g., gradient descent, simplex, and so on) to determine an optimal transformation of the grid minimizing the grid artifact metric. In order to address complex non-linear transformations, a method for grid artifact correction, such as the method shown in FIG. 8, may apply transformed grid maps locally in regions of interest to obtain corrected regions of interest, which may then be combined to form a complete corrected image. In this way, the transformations may be limited to simple linear translations of the anti-scatter grid because if the region of interest is small enough, different displacements of the grid (e.g., shift, rotation, and so on) including non-rigid displacements may be approximated through local translations in the image plane. Thus, instead of applying a given transformation to the entire acquisition, local rigid translations in the image plane may be performed for all regions of interest in order to approximate more complex displacements.

Figure 1:
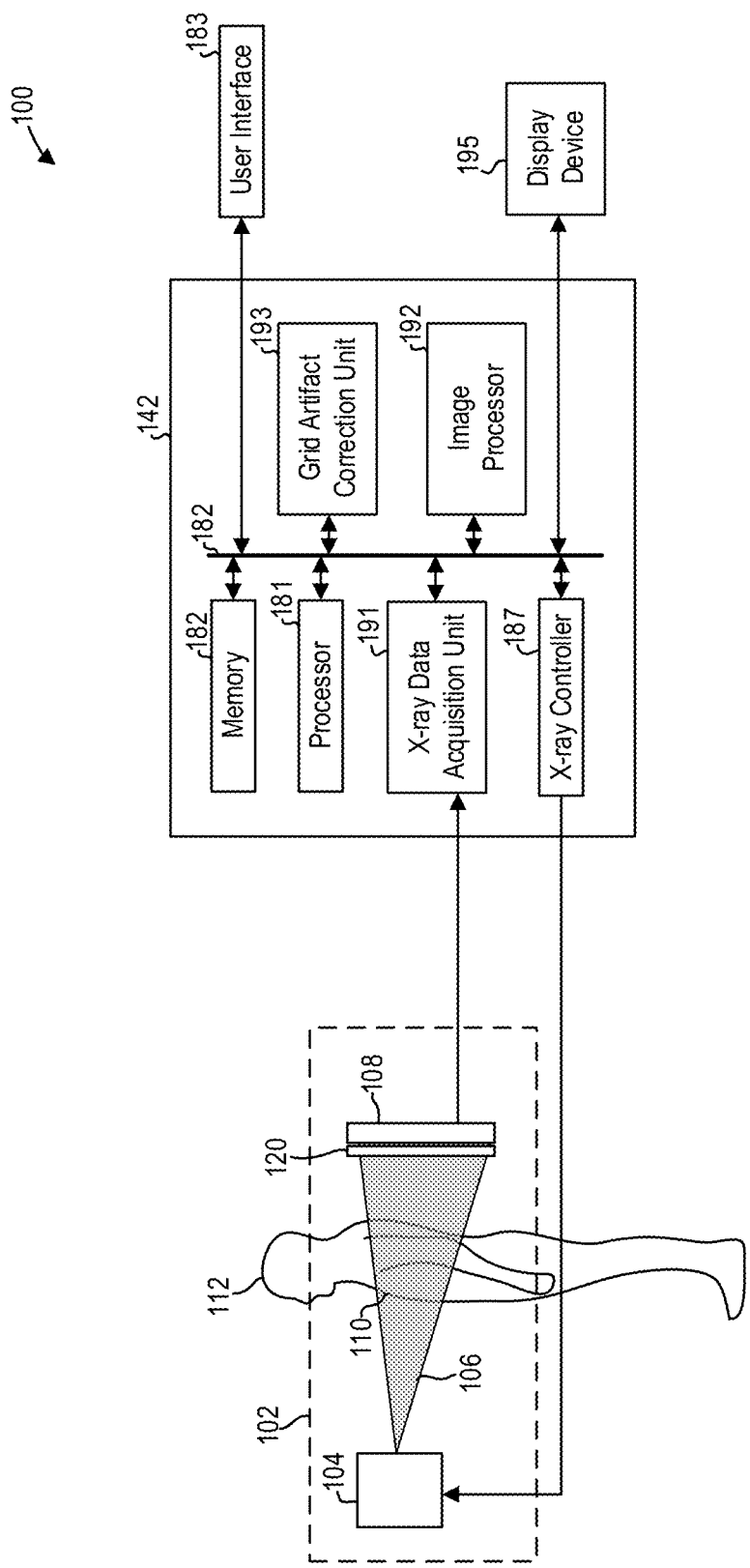
FIG. 1 shows an example x-ray imaging system according to an embodiment.

Turning now to FIG. 1, a block diagram of an x-ray imaging system 100 in accordance with an embodiment is shown. The x-ray imaging system 100 includes an image acquisition unit 102 and an operating console 142. The operating console 142 includes a processor 181, a memory 182, an x-ray controller 187, an x-ray data acquisition unit 191, an image processor 192, and a grid artifact correction unit 193. In some embodiments the grid artifact correction unit 193 may be embedded in the image processor 192. The operating console 142 is communicatively coupled to a user interface 183 and a display device 195, as depicted, though it should be appreciated that in some examples the operating console 142 may further comprise one or more of the user interface 183 and the display device 195. In some examples, the x-ray imaging system 100 comprises a mobile x-ray imaging system, such that the image acquisition unit 102 and the operating console 142 are portable or mobile.

The image acquisition unit 102 includes a radiation source such as an x-ray source 104. The x-ray source 104 is configured to emit a radiation beam such as an x-ray beam 106 having a field-of-view towards an object 110. In the example of FIG. 1, the object 110 is an anatomical region or a region of interest in a subject such as a patient 112. In another example, the object 110 may correspond to a package or a baggage in a security screening application. In yet another example, the object 110 may be a fabricated component in an industrial application.

In some examples, the x-ray imaging system 100 further includes a patient table (not shown) configured to support the patient 112 or any form of support to support the imaged organs (such as in standard mammographic systems). The x-ray beam 106 upon impinging on the anatomical region 110 may be attenuated differently by portions of the anatomical region 110. An x-ray detector 108 that is disposed in the field-of-view of the x-ray beam 106 acquires the attenuated x-ray beam. The x-ray detector 108 may comprise, as non-limiting examples, an x-ray exposure monitor, an electric substrate, and so on. The x-ray detector 108 is moveable by an operator of the mobile x-ray imaging system 100 for manually positioning relative to the x-ray beam 106.

The operating console 142 comprises a processor 181, a memory 182, an x-ray controller 187, an x-ray data acquisition unit 191, an image processor 192, and a grid artifact correction unit 193. X-ray image data acquired by the x-ray detector 108 is transmitted from the x-ray detector 108 and is received by the x-ray data acquisition unit 191. The collected x-ray image data are image-processed by the image processor 192. A display device 195 communicatively coupled to the operating console 142 displays an image-processed x-ray image thereon. The x-ray controller 187 supplies power of a suitable voltage current to the x-ray source 104 for powering the x-ray source 104; the X-ray controller 187 may additionally control other parameters including the exposure time, the source size, the source temperature, and the synchronization of the different components of the x-ray imaging system 100 before, during, and after the exposure.

The image acquisition unit 102 is further configured to generate an x-ray image corresponding to the object 110 based on the detected x-ray beam. In the example of FIG. 1, the x-ray image is a projection of the anatomical region 110 of the subject 112 in a detector plane of the x-ray detector 108.

An anti-scatter grid 120 positioned adjacent to the x-ray detector 108 as depicted prevents scattered radiation in the x-ray beam 106 from reaching the x-ray detector 108. The anti-scatter grid may be embedded in a Bucky-Potter assembly; it can be kept static or set in reciprocating motion by actuators to reduce the visibility of artifacts introduced by the grid, notably grid lines. Whether static or in reciprocating motion, a misalignment between the anti-scatter grid 120 and the x-ray detector 108 between the gain map calibration and the imaging of the subject or organ may still cause image artifacts in the resulting x-ray image. As discussed further herein, the grid artifact correction unit 193 is configured to detect and correct any residual grid artifacts in the x-ray image to generate a corrected x-ray image. To that end, the grid artifact correction unit 193 is configured to receive the x-ray image acquired by the image acquisition unit 102. Since the grid is often mobile, removable or attached to parts that may suffer mechanical constraints, the anti-scatter grid is prone to motion between the calibration and the x-ray shot.

The grid artifact correction unit 193 is configured to generate a corrected x-ray image based on the x-ray image. The corrected x-ray image corresponds to a projection of the anatomical region 110 of the subject 112. In order to generate the corrected x-ray image from the x-ray image, the grid artifact correction unit 193 is configured to generate a plurality of gain-corrected images with a plurality of transformed gain maps, evaluate the plurality of gain-corrected images with a metric to identify a corrected image with the metric minimized or deduce a transformation that would minimize the metric, and output the corrected image with the minimized metric as the corrected x-ray image. The grid artifact correction unit 193 generates the plurality of transformed gain maps by applying a plurality of transformations to an initial image of the anti-scatter grid 120 to generate a respective plurality of transformed images of the grid. The grid artifact correction unit 193 then applies an initial gain map without the grid to the plurality of transformed images of the grid to generate the plurality of transformed gain maps with the grid. The plurality of transformations comprise gain transformations that correspond to geometric transformations of the anti-scatter grid 120.

The image processor 192 is communicatively coupled to the grid artifact correction unit 193 and configured to receive the corrected x-ray image from the grid artifact correction unit 193. In some examples, the image processor 192 is configured to identify a medical condition of the anatomical region 110 of the subject 112 based on the corrected x-ray image. In one embodiment, the image processor 192 is configured to display the corrected x-ray image, the identified medical condition, or a combination thereof on the display device 195. To that end, the image processor 192 processes the corrected x-ray image with one or more image processing techniques, including but not limited to segmentation techniques, contrast management, deep learning techniques, and so on.

In some examples, the grid artifact correction unit 193 may be integrated into the x-ray data acquisition unit 191, for example, such that the grid artifact corrections described herein are a part of the acquisition chain rather than an offline correction. In this way, grid artifact corrections may be performed concurrently with image acquisition, where the grid artifact corrections are applied to raw images upon acquisition and prior to and/or independent of any additional downstream image processing.

In some examples, the display device 195 may be integrated with the user interface 183. For example, the display device 195 may comprise a touch-sensitive display device or a touchscreen, such that the display device 195 may display a graphical user interface and detect inputs by an operator.

Further, the processor 181 is communicatively coupled to the grid artifact correction unit 193, the memory unit 182, and the image processor 192 via a communication bus 182 and configured to provide computing and control functionalities. The processor 181 includes at least one of a central processing unit (CPU), a graphics processing unit (GPU), a digital signal processor, and a controller. In other embodiments, the processor 181 includes a customized processor element such as, but not limited to, an application-specific integrated circuit (ASIC) and a field-programmable gate array (FPGA). The processor 181 may be further configured to receive commands and/or parameters from an operator via the user interface 183. In some embodiments, the processor 181 may perform one or more functions of at least one of the image acquisition unit 102 and the grid artifact correction unit 193. The processor 181 may include more than one processor cooperatively working with each other for performing the functions described herein. The processor 181 may also be configured to store and retrieve contents into and from the memory 182. In one example, the processor 181 is configured to initiate and control the functionality of at least one of the image acquisition unit 102 and the grid artifact correction unit 193.

In one embodiment, the memory 182 comprises a random-access memory (RAM), read-only memory (ROM), flash memory, or any other type of computer-readable memory accessible by one or more of the image acquisition unit 102, the grid artifact correction unit 193, the image processor 192, and the processor 181. Also, in some examples, the memory 182 comprises a non-transitory computer-readable medium encoded with a program having a plurality of instructions to instruct at least one of the image acquisition unit 102, the grid artifact correction unit 193, the image processor 192, and the processor 181 to perform a sequence of steps to generate the corrected x-ray image. The program may further instruct the display device 195 to display the corrected x-ray image to the operator for evaluation of the corrected x-ray image.

As noted hereinabove, any misalignment between the anti-scatter grid 120 and the x-ray detector 108 results in residual grid artifacts in the resulting x-ray image. In accordance with aspects of the present disclosure, the grid artifact correction unit 193 is configured to detect and correct any grid artifacts in the x-ray image to generate a corrected x-ray image.

As an illustrative example, FIG. 2 shows a block diagram illustrating an example method 200 for correcting grid artifacts caused by an anti-scatter grid according to an embodiment. In particular, method 200 relates to correcting an acquired image 205 with a grid artifact correction unit 210. The grid artifact correction unit 210 may comprise the grid artifact correction unit 193 of the x-ray imaging system 100, for example. An acquired image 205 includes grid artifacts arising from the anti-scatter grid 120, for example. Further, such grid artifacts may not be directly correctable via gain maps acquired during gain calibration due to a deviation of the anti-scatter grid from a calibration position of the anti-scatter grid, as described hereinabove, where the acquired image 205 is acquired while the anti-scatter grid is in an acquisition position. Further, an initial gain map with grid 212 is acquired with the anti-scatter grid in the calibration position during gain calibration, without an imaging subject between the x-ray source and the x-ray detector, such that the ratio of the initial gain map with grid 212 by the initial gain map without grid 214 is an image of the anti-scatter grid itself. Further, an initial gain map 214 is acquired without the anti-scatter grid during gain calibration.

If the anti-scatter grid were in the calibration position during acquisition of the acquired image 205, then the initial gain map 212 would suffice for correcting the grid artifacts in the acquired image 205. However, if the acquisition position or the shape or properties of the anti-scatter grid deviate from the calibration position, shape, or properties, then a corrected image obtained by correcting the acquired image 205 with the initial gain map 212 would still include grid artifacts, from both the acquired image and the initial gain map 212. Therefore, to correct the acquired image 205, the grid artifact correction unit 210 transforms the initial image of the grid into a plurality of transformed images of the grid. In particular, the grid artifact correction unit 210 applies a plurality of transformations to the initial image of the grid to generate a respective plurality of transformed images of the grid.

Each transformation of the plurality of transformations comprises a geometric transformation that shifts a position of the anti-scatter grid in the initial image to a transformed position. The space of possible geometric transformations of the anti-scatter grid may be described as parameterized geometric transformations, including but not limited to linear transformations of the coordinates, non-linear transformations defined on a spline basis, and so on. In this way, the set of parameters defining a transformation that minimizes a grid artifact metric may be determined. During the minimization or optimization process, a grid artifact metric is evaluated at a plurality of parameter values. For example, if the space of transformations is a set of unidirectional translations in the plane parallel to the coordinate axes, at least one transformation of the plurality of transformations corresponds to a translation along a first axis, such as an x-axis, of the x-ray detector, while at least one other transformation of the plurality of transformations corresponds to a translation along a second axis, such as a y-axis, of the x-ray detector. As an illustrative and non-limiting example, FIG. 3 shows a diagram 300 illustrating an example orientation of an anti-scatter grid relative to imaged anatomy according to an embodiment. As depicted, for a mammography application wherein the x-ray imaging system is configured to image breasts, a first axis of the x-ray detector such as the x-axis may extend along the chest wall or from a first rail to a second rail (e.g., a left rail to a right rail) of a carrier where the breast is positioned on a bucky inserted between the rails, the bucky comprising the anti-scatter grid and a carbon cover. The second axis of the x-ray detector, such as the y-axis as depicted, thus extends in the direction of the rails, or from the chest wall to the nipple side of the breast. It should be appreciated that the depiction of the particular axes is illustrative and non-limiting. For example, the x and y axes may be switched, and the orientation of the axes relative to the imaged anatomy may be different depending on the imaging application and the arrangement of the x-ray imaging system components. Nevertheless, the first axis and the second axis correspond to the horizontal surface of the x-ray detector. Alternatively, the first axis and the second axis may correspond to the anti-scatter grid. As the anti-scatter grid is positioned over the horizontal surface of the x-ray detector, the axes of the anti-scatter grid are preferably aligned with the axes of the x-ray detector.

Referring again to FIG. 2, the plurality of transformations applied to the initial image of the grid may include, as an illustrative and non-limiting example, a first plurality of transformations that translate the position of the grid in the initial image in the first direction (e.g., the x direction) as well as a second plurality of transformations that translate the position of the grid in the initial image in the second direction (e.g., the y direction). The first plurality of transformations may include a range of linear displacements of the grid in the first direction. For example, a first transformation may linearly translate the grid in the first direction by a first distance, a second transformation may linearly translate the grid in the first direction by a second distance, a third transformation may linearly translate the grid in the first direction by a third distance, and so on. Similarly, the second plurality of transformations may include a range of linear displacements of the grid in the second direction. Each transformation of the plurality of transformations is applied to the initial image of the grid to obtain a respective plurality of transformed images of the grid. In some minimization processes, the transformations to apply to the grid image are determined iteratively based on previous values of the grid artifact metric for previous transformations.

The grid artifact correction unit 210 then combines the plurality of transformed images of the grid and the initial gain map 214 without the grid to generate a plurality of transformed gain maps with the grid, where each transformed gain map corresponds to a different transformation of the plurality of transformations. It should be appreciated that the transformations of the plurality of transformations comprise gain transformations that correspond to physical transformations of the anti-scatter grid. In this way, each transformed gain map corresponds to a gain map for the anti-scatter grid in the transformed position. The correction may be applied in two steps as well: first the image is corrected by the gain map without the grid before applying any transformed grid gain map, and then only the correction with the image with the grid is reapplied for each candidate transformation. It should be appreciated that the grid artifact correction unit 210 may use, in a first example, two gain maps (i.e., one with the grid and one without the grid), or in a second example, one gain map (without the grid) and an image of the grid, where the grid artifact correction unit may obtain the image of the grid in the second example from the two gain maps in the first example.

The grid artifact correction unit 210 then corrects the acquired image 205 with the plurality of transformed gain maps to generate a plurality of corrected images. By correcting the acquired image 205 with the plurality of transformed gain maps, the correction of each corrected image of the plurality of corrected images corresponds to a correction of grid artifacts with the grid in the corresponding transformed position as described hereinabove. Thus, the plurality of corrected images comprises the acquired image 205 with corrections applied according to different possible transformations of the anti-scatter grid. The transformation associated with the corrected image exhibiting the largest reduction in grid artifacts with respect to a calibration position thus indicates the projection of the anti-scatter grid during acquisition of the acquired image 205 relative to the calibration position of the anti-scatter grid in the gain map with grid 212.

In order to identify the corrected image of the plurality of corrected images with the largest reduction in grid artifacts, the grid artifact correction unit 210 calculates a metric for each corrected image to evaluate the amount of grid artifacts in the corrected image. The grid artifact correction unit 210 may use any suitable optimization algorithm to determine the transformation minimizing the grid artifact. For instance, in the case of a brute force search, a plurality of transformations are evaluated. In a gradient descent search for a parametric transformation, an initial transformation is considered, and the metric is evaluated close to this transformation to estimate the gradient of the artifact metric with respect to the transformation parameters. This gradient is then used to determine a next current transformation, and the operation is repeated until a convergence criteria is reached. As an illustrative and non-limiting example of grid artifact metric, the grid artifact correction unit 210 may convolve the corrected image with a gradient filter or kernel to obtain a gradient magnitude image. In particular, the grid artifact correction unit 210 may convolve the corrected image with a gradient filter in both the horizontal and vertical directions (e.g., the x and y directions, respectively). The gradient filters for convolving the corrected image into respective gradient images may comprise a kernel or filter that approximates a derivative of the image. For example, the gradient filters may comprise Sobel filters, Prewitt filters, Kirsch filters or other types of filters.

As an illustrative and non-limiting example, FIG. 4 shows a block diagram illustrating an example evaluation 400 of an acquisition with horizontal artifacts to quantify an amount of artifact according to an embodiment. For example, the acquired image 405 includes horizontal artifacts with a thickness less than three pixels. Convolution of the acquired image 405, via the convolution operator 410, with the x-kernel 415 for the horizontal or x direction, produces the x-gradient image 420. For artifacts with a thickness less than three pixels the x-kernel 415 may comprise a Prewitt operator such as the three-by-three matrix 440 depicted. The acquired image 405 may be convolved with a y-kernel (not shown) to obtain a y-gradient image (not shown) as well. As another example, FIG. 5 shows a block diagram illustrating an example evaluation 500 of an acquisition with vertical artifacts to quantify an amount of artifact. The acquired image 505 includes vertical artifacts with a thickness less than seven pixels. Convolution of the acquired image 505, via the convolution operator 510, with the y-kernel 515 produces the y-gradient image 520. For artifacts with a thickness less than five pixels, the y-kernel 515 may comprise the five-by-five matrix 540 as depicted, as an illustrative and non-limiting example. The acquired image 505 may be convolved with a corresponding five-by-five x-kernel (not shown) to obtain a corresponding x-gradient image (not shown) as well, in some examples.

The metric for evaluating the amount of artifacts in the evaluations 400 and 500 may comprise a measure of the gradients 420 and 520, for example. As an illustrative and non-limiting example, the metric may comprise the Euclidean norm of both gradients (e.g., in the x and y axes) for a corrected image, each gradient weighted by the size of their corresponding kernel, divided by the value of the signal of the corrected image. This measure is equivalent to the derivative of the logarithm of the acquisition. Both measures quantify an amount of artifact in the acquired image.

Thus, referring again to FIG. 2, the grid artifact correction unit 210 calculates the metric characterizing an amount of grid artifacts present in each corrected image of the plurality of corrected images, and selects the corrected image with the smallest amount of grid artifacts. The grid artifact correction unit 210 thus outputs the corrected image 220 comprising the corrected image with the smallest amount of grid artifacts or the largest reduction in grid artifacts. Further, in some examples, the grid artifact correction unit 210 may identify the transformed gain map, and thus the corresponding transformation, used to obtain the corrected image 220, and may store the transformed gain map for subsequent image corrections.

Figure 6:
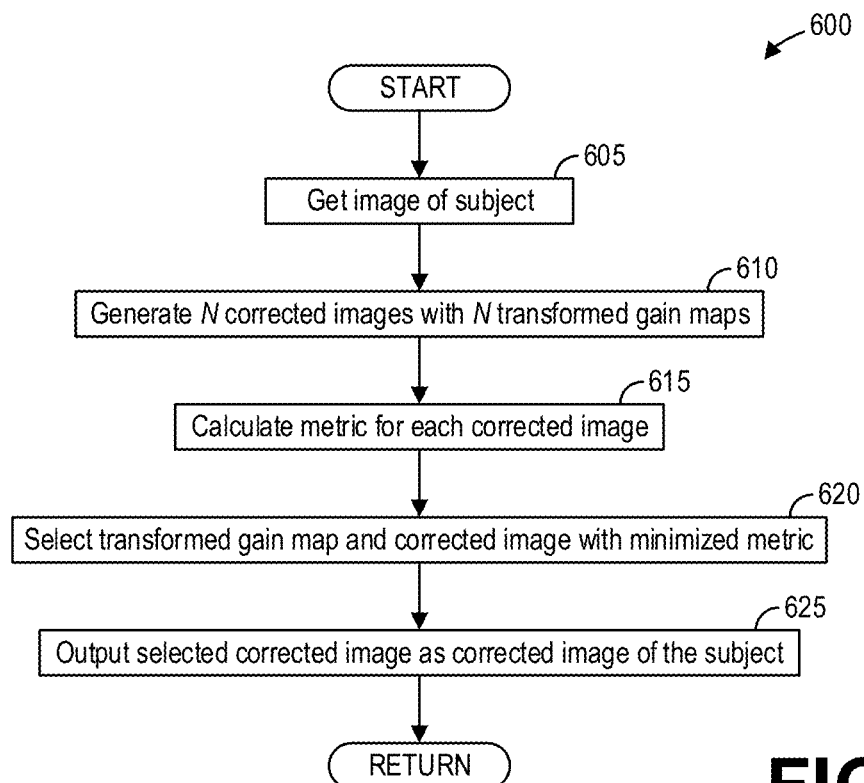
FIG. 6 shows a high-level flow chart illustrating an example method for correcting grid artifacts according to an embodiment.
Figure 7:
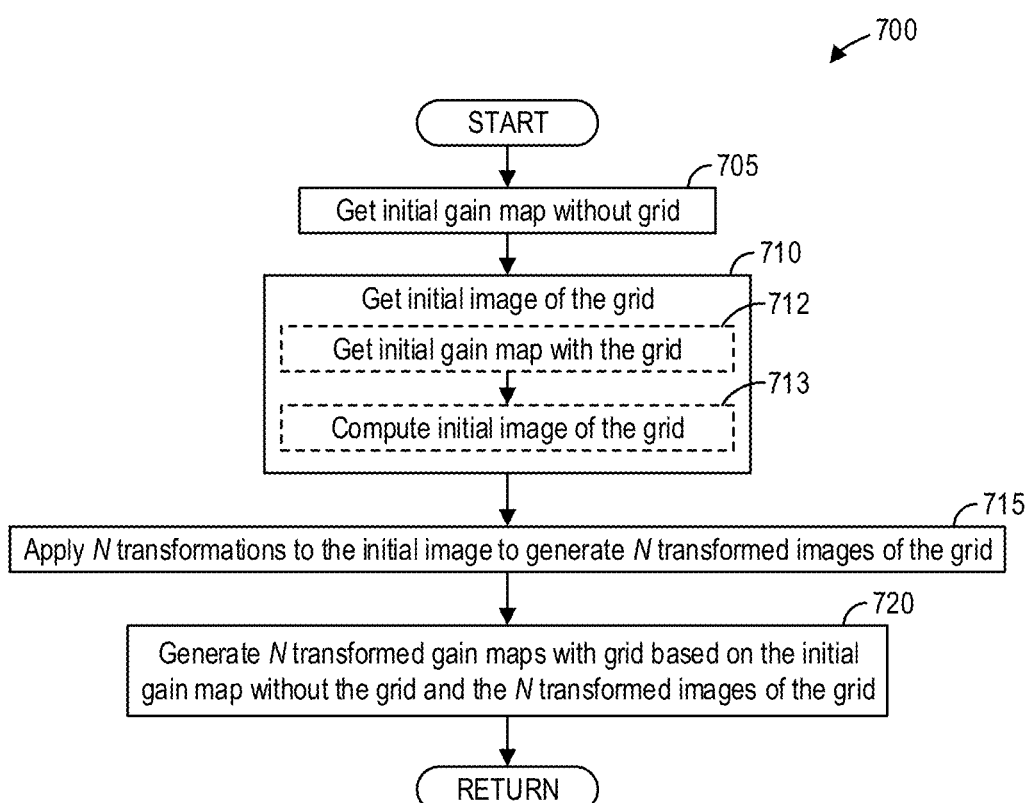
FIG. 7 shows a high-level flow chart illustrating an example method for generating a plurality of transformed gain maps with grid for a corresponding plurality of geometric transformations according to an embodiment.

FIG. 6 shows a high-level flow chart illustrating an example method 600 for correcting grid artifacts according to an embodiment. In particular, method 600 relates to correcting grid artifacts in an image with a plurality of transformed gain maps. Method 600 is described with regard to the systems and components of FIGS. 1 and 2, though it should be appreciated that the method may be implemented with other systems and components without departing from the scope of the present disclosure. Method 600 may be implemented as executable instructions in non-transitory memory, such as memory 182, and may be executed by a processor, including one or more of the processor 181, the image processor 192, or the grid artifact correction unit 193, of an x-ray imaging system, such as the x-ray imaging system 100.

Method 600 begins at 605. At 605, method 600 gets an image of the subject. For example, method 600 may acquire the image of the subject by controlling the x-ray source 104 and the x-ray detector 108 to image the object 110 positioned therebetween. As another example, method 600 may retrieve the image of the object 110 obtained via the x-ray source 104 and the x-ray detector 108 from memory 182.

At 610, method 600 generates a plurality of corrected images, such as N corrected images, with a plurality of transformed gain maps, such as N transformed gain maps. Each transformed gain map corresponds to a shift in position of the anti-scatter grid, and so each corrected image is corrected assuming the corresponding shift in position of the anti-scatter grid. A method for obtaining the plurality of transformed gain maps is described further herein with regard to FIG. 7.

At 615, method 600 calculates a metric for each corrected image of the plurality of corrected images. For example, the metric characterizes or quantifies an amount of grid artifacts present in the corrected images. To that end, the metric may be calculated based on horizontal and vertical gradients of the corrected images because the grid artifacts are primarily horizontal and/or vertical due to the grid configuration of the anti-scatter grid. It should be appreciated that other metrics may be used for non-linear grids.

As an illustrative and non-limiting example, method 600 may convolve each corrected image with a horizontal gradient kernel or filter to obtain a horizontal gradient image. Method 600 may further convolve each corrected image with a vertical gradient kernel to obtain a vertical gradient image. The dimensions of the horizontal gradient kernel and the vertical gradient kernel may be proportional to the size of grid artifacts (e.g., the thickness of the artifacts measured in pixels) in the acquired image. Method 600 may then calculate the metric for each corrected image based on the horizontal gradient image and the vertical gradient image for each corrected image. For example, the metric may comprise the Euclidean norm of both gradient images, each Euclidean norm weighted by the size of the corresponding gradient kernel and divided by the value of the signal (e.g., the value of the initial image). As another example, method 600 may calculate the derivative of the logarithm of the corrected image. Both metrics characterize an amount of grid artifacts in the corrected image.

At 620, method 600 selects a transformed gain map and a corrected image with the minimized metric. For example, method 600 selects the corrected image from the plurality of corrected images based on the metric, wherein the selected corrected image includes the smallest amount of grid artifacts relative to other corrected images of the plurality of corrected images according to the metric. As the metric characterizes an amount of grid artifacts in the corrected image, method 600 selects the corrected image with the smallest measure of the metric. In other words, method 600 selects the corrected image from the plurality of corrected images based on the metric, wherein method 600 selects the corrected image in particular because the calculated metric for the corrected image is smaller than the calculated metric for each other corrected image, and therefore the amount of artifacts in the corrected image is minimized relative to the amount of artifacts in the other corrected images of the plurality of corrected images. The transformed gain map used to obtain the selected corrected image may be used to correct additional images.

At 625, method 600 outputs the selected corrected image as the corrected image of the subject. Method 600 may output the selected corrected image, for example, to a display device such as the display device 195 for display to an operator of the x-ray imaging system. Additionally or alternatively, method 600 may output the selected corrected image to memory 182 for storage and/or to a picture archiving and communication system (PACS) for remote review. Method 600 then returns.

FIG. 7 shows a high-level flow chart illustrating an example method 700 for generating a plurality of transformed gain maps for a corresponding plurality of geometric transformations according to an embodiment. In particular, method 700 relates to applying a plurality of transformations to an initial image of the grid, and combining the respective transformed images of the grid with an initial gain map to generate the plurality of transformed gain maps. Method 700 is described with regard to the systems and components of FIG. 1, though it should be appreciated that the method may be implemented with other systems and components without departing from the scope of the present disclosure. Method 700 may be implemented as executable instructions in non-transitory memory, such as memory 182, and may be executed by a processor, including one or more of the processor 181, the image processor 192, or the grid artifact correction unit 193, of an x-ray imaging system, such as the x-ray imaging system 100.

Method 700 begins at 705. At 705, method 700 acquires an initial gain map without the grid. For example, method 700 may control the x-ray source 104 and the x-ray detector 108 to acquire calibration data including the initial gain map while the anti-scatter grid 120 is not positioned between the x-ray source 104 and the x-ray detector 108. Alternatively, method 700 may retrieve the initial gain map without the grid from memory, such as memory 182. Further, at 710, method 700 acquires an initial image of the grid. In some examples, method 700 may directly acquire the initial image of the grid, for example by controlling the x-ray source 104 and the x-ray detector 108 to acquire the initial image of the grid. In other examples, method 700 may first, at 712, acquire an initial gain map of the grid. For example, method 700 may control the x-ray source 104 and the x-ray detector 108 to acquire a gain map while the anti-scatter grid 120 is positioned between the x-ray source 104 and the x-ray detector 108, but no object 110 is positioned between the x-ray source 104 and the anti-scatter grid 120, such that the acquired image is an initial gain map of the anti-scatter grid 120. Then, at 713, method 700 may compute the initial image of the grid by dividing the initial gain map with the grid by the initial gain map without the grid. As the position of the anti-scatter grid 120 may deviate from the calibration position over time, grid artifacts may arise when correcting acquisitions based on the initial image of the grid and the initial gain map alone.

Therefore, at 715, method 700 applies a plurality of transformations, such as N transformations where N is an integer greater than one, to the initial image of the grid to generate a plurality of transformed images of the grid, such as N transformed images of the grid. Each transformation of the plurality of transformations comprises a geometric transformation that shifts the initial image of the grid to a transformed position. For example, at least one transformation of the plurality of transformations corresponds to a translation along a first axis, such as a horizontal axis, of the x-ray detector, while at least one other transformation of the plurality of transformations corresponds to a translation along a second axis, such as a vertical axis, of the x-ray detector. The plurality of transformations applied to the initial image of the grid may include a first plurality of transformations that translate the position of the grid in the initial image in the first direction (e.g., the x direction or the horizontal direction) as well as a second plurality of transformations that translate the position of the grid in the initial image in the second direction (e.g., the y direction or the vertical direction). The first plurality of transformations may include a range of linear displacements of the grid in the first direction. For example, a first transformation may linearly translate the grid in the first direction by a first distance, a second transformation may linearly translate the grid in the first direction by a second distance, a third transformation may linearly translate the grid in the first direction by a third distance, and so on. Similarly, the second plurality of transformations may include a range of linear displacements of the grid in the second direction. Method 700 applies each transformation of the plurality of transformations to the initial image of the grid to obtain a respective plurality of transformed images of the grid.

Continuing at 720, method 700 generates a plurality of transformed gain maps with the grid, such as N transformed gain maps with the grid, based on the initial gain map without the grid and the plurality of transformed images of the grid. For example, method 700 combines each transformed image of the grid with the initial gain map to generate a corresponding transformed gain map, and in this way method 700 generates the plurality of transformed gain maps. The plurality of transformed gain maps may thus be used to correct acquired images as described hereinabove with regard to FIG. 6. Method 700 then returns.

Thus, a method for x-ray imaging comprises acquiring, with an x-ray detector, an x-ray image of a subject, correcting the x-ray image with a plurality of transformed gain maps to generate a plurality of corrected images, selecting a corrected image of the plurality of corrected images with minimized artifacts caused by an anti-scatter grid, and outputting the corrected image. The plurality of transformed gain maps are transformed based on a plurality of transformations, wherein each transformation corresponds to a shift in position of the anti-scatter grid relative to the x-ray detector. In this way, grid artifacts arising from a misalignment of the anti-scatter grid or a deviation from a calibration position may be corrected.

Although the methods described in FIGS. 6 and 7 relate to correcting an entire acquired image with a transformed gain map, the transformation of the entire image with a single transformation may not accurately reduce grid artifacts throughout the entire acquired image if the shift in position of the anti-scatter grid relative to the x-ray detector is not represented by a transformation of the plurality of transformations as described hereinabove. For example, if the plurality of transformations includes linear translations in the detector plane (e.g., the horizontal x-y plane of the detector surface), but the anti-scatter grid is skewed or rotated relative to the detector plane, then a single transformation of the plurality of transformations may not reduce grid artifacts throughout the acquired image. In some examples, the plurality of transformations may include three-dimensional geometric transformations such as linear translations and rotations of the anti-scatter grid. However, for more complex transformations such as rotational transformations or non-rigid transformations, the corresponding space describing such rotations is relatively larger than for linear translations, and as a result the process of identifying an optimal transformation may become cumbersome and computationally expensive.

In order to correct grid artifacts throughout an acquired image regardless of the complexity of the displacement of the anti-scatter grid relative to the x-ray detector, the acquired image may be corrected in patches or regions rather than as a single entity. For example, if the patch size or region of interest is small enough, complex displacements of the anti-scatter grid may be approximated with local translations in the image plane. That is, a plurality of transformations including linear translations in the first and second axes described hereinabove may approximate more complex displacements such as rotations, and shifts of the anti-scatter grid. Instead of applying a given transformation to the entire acquisition, local translations in the image plane (i.e., rigid transformations) are performed for all regions of interest dividing or splitting the acquisition in order to approximate more complex displacements (i.e., non-rigid transformations).

Figure 8:
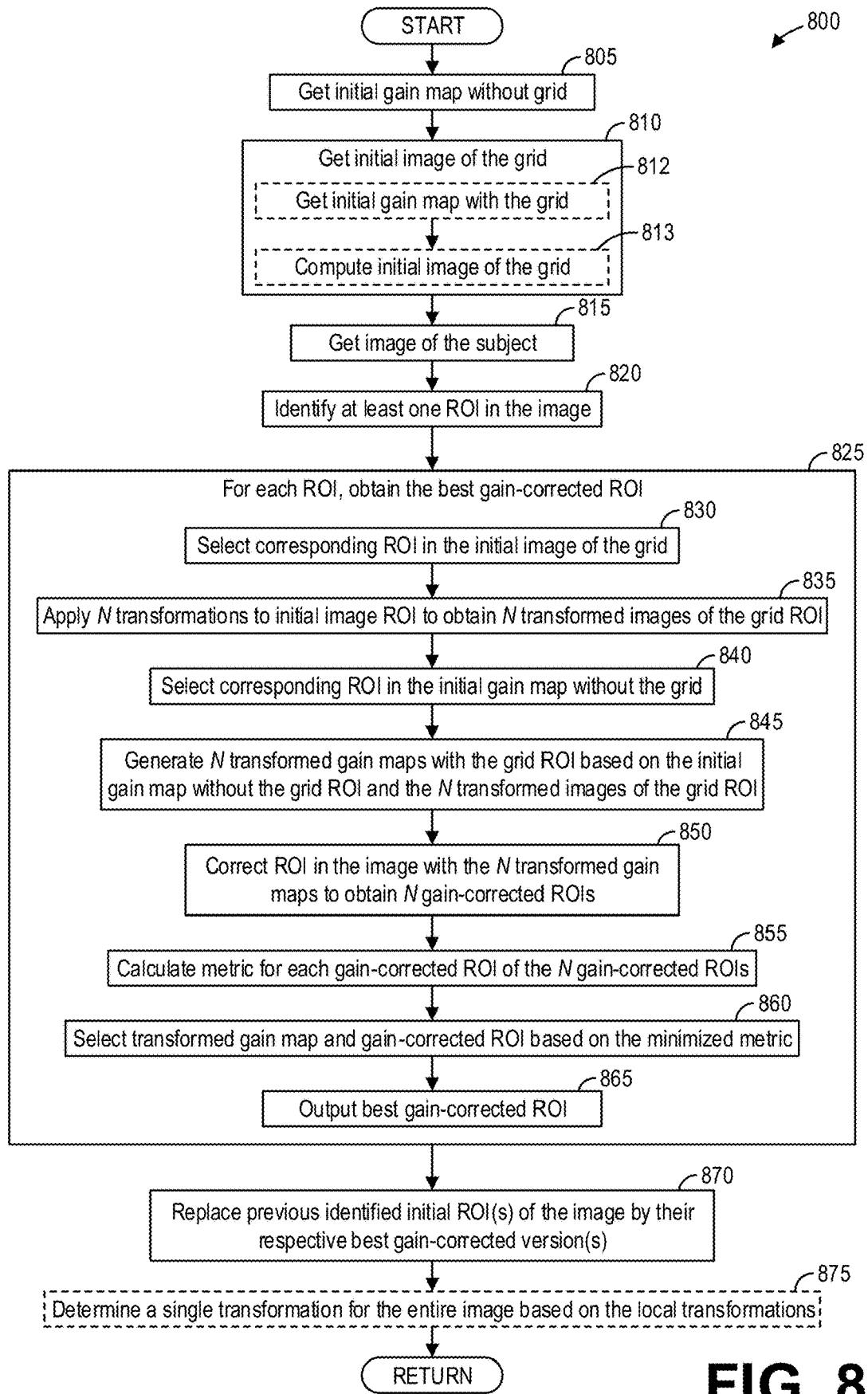
FIG. 8 shows a high-level flow chart illustrating an example method for correcting grid artifacts with local registration according to an embodiment.

As an illustrative and non-limiting example, FIG. 8 shows a high-level flow chart illustrating an example method 800 for correcting grid artifacts with local registration according to an embodiment. In particular, method 800 relates to correcting grid artifacts within identified regions of interest in an image. Method 800 is described with regard to the systems and components of FIG. 1, though it should be appreciated that the method may be implemented with other systems and components without departing from the scope of the present disclosure. Method 800 may be implemented as executable instructions in non-transitory memory, such as memory 182, and may be executed by a processor, including one or more of the processor 181, the image processor 192, or the grid artifact correction unit 193, of an x-ray imaging system, such as the x-ray imaging system 100.

Method 800 begins at 805. At 805, method 800 acquires an initial gain map without the grid. For example, method 800 may control the x-ray source 104 and the x-ray detector 108 to acquire calibration data including the initial gain map while the anti-scatter grid 120 is not positioned between the x-ray source 104 and the x-ray detector 108. Alternatively, method 800 may retrieve the initial gain map without the grid from memory, such as memory 182.

At 810, method 800 acquires an initial image of the grid. In some examples, method 800 directly acquires the initial image of the grid 120, for example, by controlling the x-ray source 104 to generate an x-ray beam 106 toward the x-ray detector 108 with the anti-scatter grid 120 positioned between the x-ray detector 108 and the x-ray source 104. As the initial image with the grid 120 may be acquired during a calibration mode executed prior to an imaging session of a subject, method 800 may retrieve the initial image with the grid from non-transitory memory such as memory 182, in some examples. In other examples, method 800 may acquire the initial image of the grid by first acquiring, at 812, an initial gain map with the grid by controlling the x-ray source 104 to generate an x-ray beam 106 toward the x-ray detector 108 with the anti-scatter grid 120 positioned between the x-ray detector 108 and the x-ray source 104, and to acquire the initial gain map with the grid, or alternatively method 800 may retrieve the initial gain map with the grid from memory. Method 800 may then, at 813, compute the initial image of the grid based on the initial gain map with the grid and the initial gain map with the grid.

Continuing at 815, method 800 gets an image of the subject. For example, method 800 may acquire the image of the subject by controlling the x-ray source 104 and the x-ray detector 108 to image the object 110 positioned therebetween, where the anti-scatter grid is positioned between the object 110 and the x-ray detector 108 for reducing detection of scattered x-rays. As another example, method 800 may retrieve an image of the object 110 obtained via the x-ray source 104 and the x-ray detector 108 from memory 182.

At 820, method 800 identifies at least one region of interest (ROI) in the image of the subject. In some examples, method 800 may identify the at least one ROI by segmenting the image of the subject, for example based on the content of the image. As an illustrative and non-limiting example, method 800 may identify the at least one ROI by segmenting the image of the subject through edge detection or thresholding. In other examples, method 800 may identify the at least one ROI by segmenting the image into a plurality of segments not based on the content of the image. For example, method 800 may divide the image into a plurality of equal-sized patches or segments that are small enough such that linear translations effectively approximate more complex displacements of the anti-scatter grid. Each segment of the plurality of segments may comprise an ROI.

At 825, method 800 obtains a gain-corrected ROI for each ROI identified at 820. In particular, method 800 obtains a best gain-corrected ROI for each ROI. To that end, step 825 comprises a sub-routine executed for each ROI. For a given ROI, at 830, method 800 selects a corresponding ROI in the initial image of the grid, where the corresponding ROI in the initial image is at a same position as the given ROI in the image of the subject. At 835, method 800 applies a plurality of transformations to the initial image ROI to obtain a plurality of transformed images of the grid ROI. That is, method 800 transforms the initial image ROI according to the plurality of transformations to generate a plurality of transformed ROIs. At 840, method 800 selects, for the given ROI in the image of the subject, a corresponding ROI in the initial gain map without the grid. At 845, method 800 generates a plurality of transformed gain maps with the grid ROI based on the initial gain map without the grid ROI (i.e., the corresponding ROI in the initial gain map) and the plurality of transformed images of the grid ROI (i.e., the transformed ROIs). At 850, method 800 corrects the ROI in the image of the subject with the plurality of transformed gain maps (i.e., the transformed ROI gain maps) to obtain a respective plurality of gain-corrected ROIs. At 855, method 800 calculates a metric for each gain-corrected ROI of the plurality of gain-corrected ROIs, where the metric characterizes an amount of grid artifacts in each gain-corrected ROI. At 860, method 800 selects a transformed gain map and a gain-corrected ROI based on the metric. At 865, method 800 outputs a best gain-corrected ROI comprising the gain-corrected ROI selected based on the metric. Method 800 thus obtains a best gain-corrected ROI for each ROI of the image of the subject identified at 820.

At 870, method 800 outputs a corrected image including the best gain-corrected ROI(s). For example, for each ROI of the image of the subject, the corrected image includes the best gain-corrected ROI in place of the ROI. To that end, method 800 replaces the previous identified initial ROI(s) of the image of the subject by their respective best gain-corrected version(s). The transformations responsible for correcting each ROI may be different depending on the overall displacement of the anti-scatter grid. For example, a transformation for correcting a first ROI may be different than a transformation for correcting a second ROI. Method 800 may output the corrected image to one or more of a display device, a memory, and a PACS as illustrative and non-limiting examples.

In some examples, continuing at 875, method 800 may further determine a single transformation for the entire image based on the local transformations. For example, method 800 may determine a single gain transformation for the entire image by using a spline, regularization or best-fit approach. Method 800 then returns.

Figure 9:
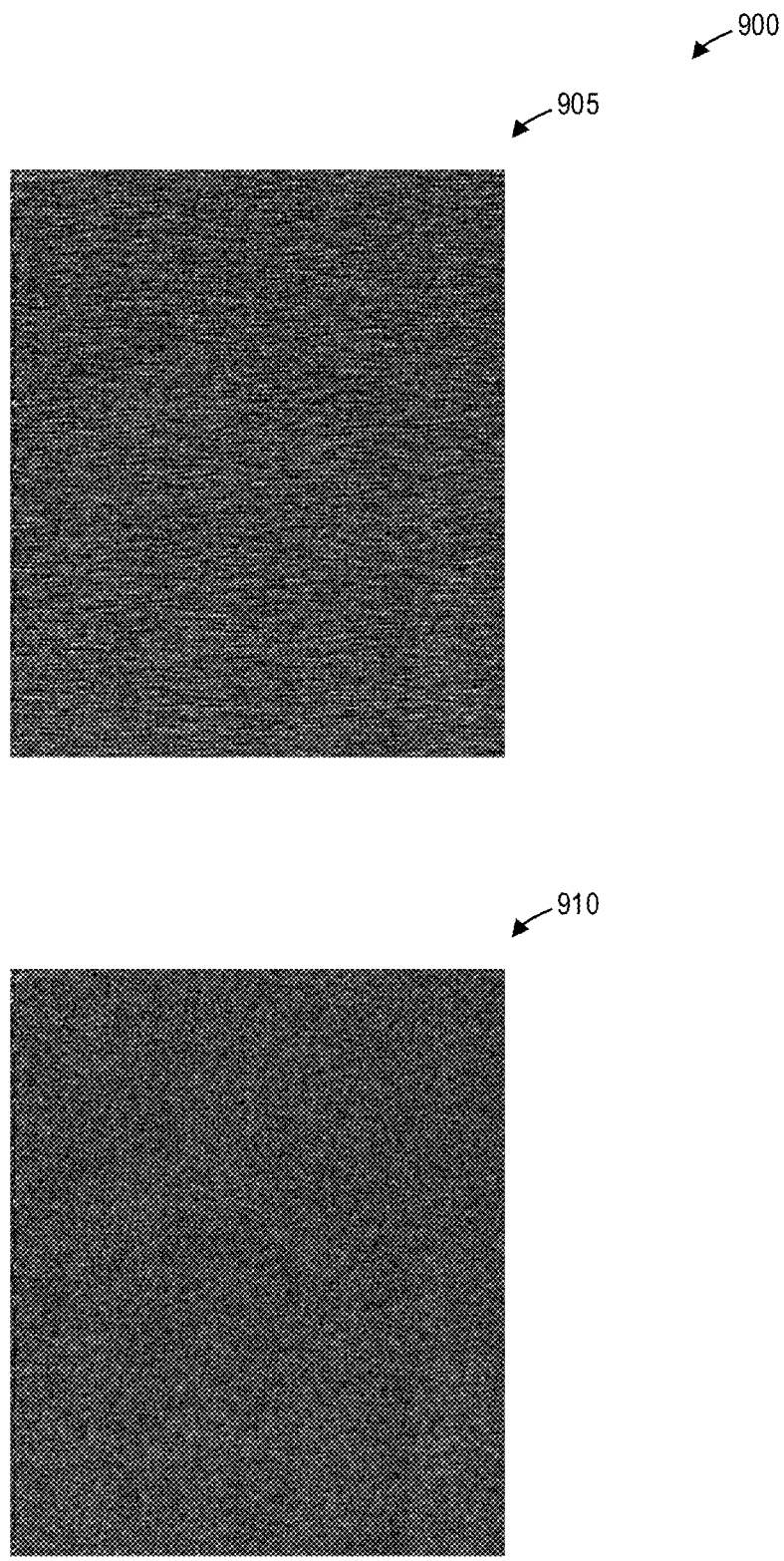
FIG. 9 shows a set of images including an example acquired image with grid artifacts and an example corrected image with grid artifact reduction according to an embodiment.

As an illustrative example, FIG. 9 shows a set of images 900 including an example acquired image 905 with grid artifacts and an example corrected image 910 with grid artifact reduction according to an embodiment. As depicted, the acquired image 905 exhibits horizontal grid artifacts, whereas the corrected image 910 after registration of the gain maps does not exhibit any grid artifacts. Thus, the methods provided herein for geometric transformations of a grid image and subsequent transformations of gain maps may effectively correct or reduce grid artifacts in acquired images.

A technical effect of the disclosure includes removal of image artifacts caused by an anti-scatter grid in x-ray images. Another technical effect of the disclosure includes the acquisition of an x-ray image with image artifacts caused by an anti-scatter grid, and the display of the x-ray image with such image artifacts removed. Yet another technical effect of the disclosure includes the generation of a plurality of corrected images corresponding to different displacements of an anti-scatter grid relative to an x-ray detector, and an output of a corrected image from the plurality of corrected images with a least amount of grid artifacts. Another technical effect of the disclosure includes the identification of a geometrical transformation for a selected/optimal image that minimizes a grid artifact metric. Yet another technical effect of the disclosure includes the automatic or manual physical re-positioning of an anti-scatter grid according to such an identified geometrical transformation, or its inverse.

In one representation, a method comprises acquiring, with an x-ray detector, an x-ray image of a subject, determining a gain transformation that minimizes anti-scatter grid artifacts in the x-ray image, correcting the x-ray image according to the gain transformation to generate a corrected image, and outputting the corrected image. In a first example of the method, the method further comprises acquiring an initial gain map with the anti-scatter grid, and applying a plurality of gain transformations to the initial gain map with the anti-scatter grid to generate a plurality of transformed gain maps with the anti-scatter grid. In a second example of the method optionally including the first example, the method further comprises acquiring an initial gain map without the anti-scatter grid, and generating the plurality of transformed gain maps based on the plurality of transformed images of the anti-scatter grid and the initial gain map without the anti-scatter grid. In a third example of the method optionally including one or more of the first and second examples, the plurality of gain transformations comprise a plurality of translations in a first direction and a plurality of translations in a second direction, wherein the plurality of gain transformations transform a projection of the anti-scatter grid relative to the x-ray detector in the initial image of the anti-scatter grid. In a fourth example of the method optionally including one or more of the first through third examples, determining the gain transformation that minimizes the anti-scatter grid artifacts in the x-ray image and correcting the x-ray image according to the gain transformation to generate the corrected image comprises: correcting the x-ray image with the plurality of transformed gain maps to generate a plurality of corrected images; computing a plurality of anti-scatter grid artifact metrics including an anti-scatter grid artifact metric for each corrected image of the plurality of corrected images; determining the gain transformation from the plurality of gain transformations that minimizes the anti-scatter grid artifact metric; and selecting, from the plurality of corrected images, the corrected image corrected with the determined gain transformation. In a fifth example of the method optionally including one or more of the first through fourth examples, determining the gain transformation from the plurality of gain transformations that minimizes the anti-scatter grid artifact metric comprises determining the gain transformation corresponding to the corrected image with a smallest measure of the anti-scatter grid artifact metric. In a sixth example of the method optionally including one or more of the first through fifth examples, the method further comprises identifying a plurality of regions of interest in the x-ray image, wherein correcting the x-ray image with the plurality of transformed gain maps to generate the plurality of corrected images comprises correcting each region of interest of the plurality of regions of interest with the plurality of transformed gain maps to generate a respective plurality of corrected regions of interest. In a seventh example of the method optionally including one or more of the first through sixth examples, selecting, from the plurality of corrected images, the corrected image corrected with the determined gain transformation comprises selecting a corrected region of interest with minimized artifacts for each region of interest in the x-ray image, and generating the corrected image from the corrected region of interest for each region of interest in the x-ray image.

In one embodiment, a method comprises acquiring, with an x-ray detector, an x-ray image of a subject, determining a transformation that minimizes anti-scatter grid artifacts in the x-ray image, correcting the x-ray image according to the transformation to generate a corrected image, and outputting the corrected image. In a first example of the method, the method further comprises acquiring an initial gain map with the anti-scatter grid, and applying a plurality of transformations to the initial gain map with the anti-scatter grid to generate a plurality of transformed gain maps with the anti-scatter grid. In a second example of the method optionally including the first example, the method further comprises acquiring an initial gain map without the anti-scatter grid, and generating the plurality of transformed gain maps based on the plurality of transformed images of the anti-scatter grid and the initial gain map without the anti-scatter grid. In a third example of the method optionally including one or more of the first and second examples, the plurality of transformations comprise a plurality of translations, wherein the plurality of transformations transform a projection of the anti-scatter grid relative to the x-ray detector. In a fourth example of the method optionally including one or more of the first through third examples, determining the transformation that minimizes the anti-scatter grid artifacts in the x-ray image comprises evaluating the plurality of transformations to determine the transformation that minimizes an anti-scatter grid artifact metric. In a fifth example of the method optionally including one or more of the first through fourth examples, determining the transformation that minimizes the anti-scatter grid artifacts in the x-ray image and correcting the x-ray image according to the transformation to generate the corrected image comprises: correcting the x-ray image with the plurality of transformed gain maps to generate a plurality of corrected images; computing a plurality of anti-scatter grid artifact metrics including an anti-scatter grid artifact metric for each corrected image of the plurality of corrected images; determining, based on the plurality of transformations, the transformation that minimizes the anti-scatter grid artifact metric based on the plurality of anti-scatter grid artifact metrics; and selecting, from the plurality of corrected images, or computing the corrected image corrected with the determined transformation. In a sixth example of the method optionally including one or more of the first through fifth examples, the method further comprises identifying a plurality of regions of interest in the x-ray image, wherein correcting the x-ray image with the plurality of transformed gain maps to generate the plurality of corrected images comprises correcting each region of interest of the plurality of regions of interest with the plurality of transformed gain maps to generate a respective plurality of corrected regions of interest. In a seventh example of the method optionally including one or more of the first through sixth examples, selecting, from the plurality of corrected images, the corrected image corrected with the determined transformation comprises selecting a corrected region of interest with minimized artifacts for each region of interest in the x-ray image, and generating the corrected image from the corrected region of interest for each region of interest in the x-ray image.

In another representation, a method comprises acquiring, with an x-ray detector, an x-ray image of a subject, correcting the x-ray image with a plurality of transformed gain maps to generate a plurality of corrected images, selecting a corrected image of the plurality of corrected images with minimized artifacts caused by an anti-scatter grid, and outputting the corrected image.

In a first example of the method, the method further comprises acquiring an initial gain map with grid, and applying a plurality of transformations to the initial gain map with grid to generate a plurality of transformed gain maps with grid. In a second example of the method optionally including the first example, the method further comprises acquiring an initial gain map without the anti-scatter grid, and generating the plurality of transformed gain maps with grid based on the plurality of transformed images of the anti-scatter grid and the initial gain map without the anti-scatter grid. In a third example of the method optionally including one or more of the first and second examples, the plurality of transformations comprise a plurality of linear translations in a first direction and a plurality of linear translations in a second direction, and the plurality of transformations transform a position of the anti-scatter grid relative to the x-ray detector in the initial image of the anti-scatter grid. In a fourth example of the method optionally including one or more of the first through third examples, the method further comprises calculating a metric for each gain-corrected image of the plurality of corrected images, the metric characterizing an amount of artifacts in each gain-corrected image. In a fifth example of the method optionally including one or more of the first through sixth examples, selecting the corrected image of the plurality of corrected images with minimized artifacts caused by the anti-scatter grid comprises selecting the corrected image from the plurality of corrected images with the smallest value of the metric. In a sixth example of the method optionally including one or more of the first through fifth examples, the method further comprises identifying a plurality of regions of interest in the x-ray image, wherein correcting the x-ray image with the plurality of transformed gain maps to generate the plurality of corrected images comprises correcting each region of interest of the plurality of regions of interest with the plurality of transformed gain maps to generate a respective plurality of corrected regions of interest. In a seventh example of the method optionally including one or more of the first through sixth examples, selecting the corrected image of the plurality of corrected images with minimized artifacts caused by the anti-scatter grid comprises selecting a corrected region of interest with minimized artifacts for each region of interest in the x-ray image, and generating the corrected image from the corrected regions of interest for each region of interest in the x-ray image.

In another embodiment, a method comprises acquiring, with an x-ray detector, an x-ray image of a subject, identifying at least one region of interest in the x-ray image, correcting each region of interest of the at least one region of interest with a plurality of transformed gain maps to generate a plurality of corrected regions of interest for each region of interest, selecting, for each region of interest of the at least one region of interest, a corrected region of interest of the plurality of corrected regions of interest with minimized artifacts caused by an anti-scatter grid, and outputting a corrected image comprising the corrected region of interest selected for each region of interest.

In a first example of the method, the method further comprises acquiring an initial gain map with the anti-scatter grid, computing the initial image of the grid, identifying at least one grid region of interest corresponding to the at least one region of interest in the x-ray image, and applying a plurality of transformations to the at least one grid region of interest to generate a plurality of transformed grid regions of interest for each grid region of interest of the at least one grid region of interest. In a second example of the method optionally including the first example, the method further comprises acquiring an initial gain map without the anti-scatter grid, identifying at least one gain map region of interest corresponding to the at least one region of interest in the x-ray image, and generating the plurality of transformed gain maps for each region of interest based on the plurality of transformed grid regions of interest and the at least one gain map region of interest. In a third example of the method optionally including one or more of the first and second examples, the plurality of transformations comprise a plurality of linear translations in a first direction and a plurality of linear translations in a second direction, wherein the plurality of transformations transform a position of the anti-scatter grid relative to the x-ray detector in the at least one grid region of interest. In a fourth example of the method optionally including one or more of the first through third examples, the at least one region of interest in the x-ray image comprises at least two regions of interest including a first region of interest and a second region of interest, wherein the corrected image comprises a first corrected region of interest for the first region of interest and a second corrected region of interest for the second region of interest, and wherein a first transformation of the plurality of transformations for obtaining the first corrected region of interest is different from a second transformation of the plurality of transformations for obtaining the second corrected region of interest. In a fifth example of the method optionally including one or more of the first through fourth examples, the method further comprises calculating a metric for each corrected region of interest of the plurality of corrected regions of interest, the metric characterizing an amount of artifacts in each corrected region of interest. In a sixth example of the method optionally including one or more of the first through fifth examples, selecting, for each region of interest, the corrected region of interest of the plurality of corrected regions of interest with minimized artifacts caused by the anti-scatter grid comprises selecting the corrected region of interest from the plurality of corrected regions of interest with a smallest measure of the metric.

In yet another embodiment, an x-ray imaging system comprises an x-ray source for generating x-rays, an x-ray detector configured to detect the x-rays, an anti-scatter grid positioned between the x-ray source and the x-ray detector, and a processor configured with instructions in a non-transitory memory that when executed cause the processor to: acquire, via the x-ray detector, an x-ray image; correct the x-ray image with a plurality of transformed gain maps to generate a plurality of corrected images; select a corrected image of the plurality of corrected images with minimized artifacts caused by the anti-scatter grid; and output the corrected image.

In a first example of the system, the processor is further configured with instructions in the non-transitory memory that when executed cause the processor to: acquire an initial image of the anti-scatter grid; and apply a plurality of transformations to the initial image of the anti-scatter grid to generate a plurality of transformed images of the anti-scatter grid. In a second example of the system optionally including the first example, the processor is further configured with instructions in the non-transitory memory that when executed cause the processor to: acquire an initial gain map without the anti-scatter grid; and generate the plurality of transformed gain maps based on the plurality of transformed images of the anti-scatter grid and the initial gain map without the anti-scatter grid. In a third example of the system optionally including one or more of the first and second examples, the processor is further configured with instructions in the non-transitory memory that when executed cause the processor to calculate a metric for each gain-corrected image of the plurality of corrected images, the metric characterizing an amount of artifacts in each gain-corrected image. In a fourth example of the system optionally including one or more of the first through third examples, the processor is further configured with instructions in the non-transitory memory that when executed cause the processor to select the corrected image of the plurality of corrected images with minimized artifacts caused by the anti-scatter grid by selecting the corrected image from the plurality of corrected images with a smallest measure of the metric.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
  acquiring, with an x-ray detector, an x-ray image of a subject;
  acquiring an initial gain map with an anti-scatter grid;
  applying a plurality of transformations to the initial gain map with the anti-scatter grid to generate a plurality of transformed gain maps with the anti-scatter grid;
  determining a transformation that minimizes anti-scatter grid artifacts in the x-ray image, wherein determining the transformation that minimizes the anti-scatter grid artifacts in the x-ray image and correcting the x-ray image according to the transformation to generate the corrected image comprises:
    correcting the x-ray image with the plurality of transformed gain maps to generate a plurality of corrected images;
    computing a plurality of anti-scatter grid artifact metrics including an anti-scatter grid artifact metric for each corrected image of the plurality of corrected images;
    determining, based on the plurality of transformations, the transformation that minimizes the anti-scatter grid artifact metric based on the plurality of anti-scatter grid artifact metrics; and
    selecting, from the plurality of corrected images, or computing the corrected image corrected with the determined transformation;
  correcting the x-ray image according to the transformation to generate a corrected image; and
  outputting the corrected image.

2. The method of claim 1, further comprising acquiring an initial gain map without the anti-scatter grid, and generating the plurality of transformed gain maps based on the plurality of transformed images of the anti-scatter grid and the initial gain map without the anti-scatter grid.

3. The method of claim 1, wherein the plurality of transformations comprise a plurality of translations, and wherein the plurality of transformations transform a projection of the anti-scatter grid relative to the x-ray detector.

4. The method of claim 1, wherein determining the transformation that minimizes the anti-scatter grid artifacts in the x-ray image comprises evaluating the plurality of transformations to determine the transformation that minimizes an anti-scatter grid artifact metric.

5. The method of claim 1, further comprising identifying a plurality of regions of interest in the x-ray image, wherein correcting the x-ray image with the plurality of transformed gain maps to generate the plurality of corrected images comprises correcting each region of interest of the plurality of regions of interest with the plurality of transformed gain maps to generate a respective plurality of corrected regions of interest.

6. The method of claim 5, wherein selecting, from the plurality of corrected images, the corrected image corrected with the determined transformation comprises selecting a corrected region of interest with minimized artifacts for each region of interest in the x-ray image, and generating the corrected image from the corrected region of interest for each region of interest in the x-ray image.

7. A method, comprising:
  acquiring, with an x-ray detector, an x-ray image of a subject;
  identifying at least one region of interest in the x-ray image;
  correcting each region of interest of the at least one region of interest with a plurality of transformed gain maps to generate a plurality of corrected regions of interest for each region of interest;
  computing, for each region of interest of the at least one region of interest, a corrected region of interest of the plurality of corrected regions of interest with minimized artifacts caused by an anti-scatter grid;
  outputting a corrected image comprising the corrected region of interest selected for each region of interest; and
  calculating a metric for each corrected region of interest of the plurality of corrected regions of interest, the metric characterizing an amount of artifacts in each corrected region of interest;

wherein selecting, for each region of interest, the corrected region of interest of the plurality of corrected regions of interest with minimized artifacts caused by the anti-scatter grid comprises selecting the corrected region of interest from the plurality of corrected regions of interest with a smallest measure of the metric.

8. The method of claim 7, further comprising acquiring an initial image of the anti-scatter grid, identifying at least one grid region of interest corresponding to the at least one region of interest in the x-ray image, and applying a plurality of transformations to the at least one grid region of interest to generate a plurality of transformed grid regions of interest for each grid region of interest of the at least one grid region of interest.

9. The method of claim 8, further comprising acquiring an initial gain map without the anti-scatter grid, identifying at least one gain map region of interest corresponding to the at least one region of interest in the x-ray image, and generating the plurality of transformed gain maps for each region of interest based on the plurality of transformed grid regions of interest and the at least one gain map region of interest.

10. The method of claim 8, wherein the plurality of transformations comprise a plurality of translations, wherein the plurality of transformations transform a position of the anti-scatter grid relative to the x-ray detector in the at least one grid region of interest.

11. The method of claim 10, wherein the at least one region of interest in the x-ray image comprises at least two regions of interest including a first region of interest and a second region of interest, wherein the corrected image comprises a first corrected region of interest for the first region of interest and a second corrected region of interest for the second region of interest, and wherein a first transformation of the plurality of transformations for obtaining the first corrected region of interest is different from a second transformation of the plurality of transformations for obtaining the second corrected region of interest.

12. An x-ray imaging system, comprising:
an x-ray source for generating x-rays;
an x-ray detector configured to detect the x-rays;
an anti-scatter grid positioned between the x-ray source and the x-ray detector; and
a processor configured with instructions in a non-transitory memory that when executed cause the processor to:
acquire, via the x-ray detector, an x-ray image;
correct the x-ray image with a plurality of transformed gain maps to generate a plurality of corrected images;
select a corrected image of the plurality of corrected images with minimized artifacts caused by the anti-scatter grid; and
output the corrected image;
wherein the processor is further configured with instructions in the non-transitory memory that when executed cause the processor to:
calculate a metric for each gain-corrected image of the plurality of corrected images, the metric characterizing an amount of artifacts in each gain-corrected image; and
select the corrected image of the plurality of corrected images with minimized artifacts caused by the anti-scatter grid by selecting an image from the plurality of corrected images with a smallest amount of the metric.

13. The system of claim 12, wherein the processor is further configured with instructions in the non-transitory memory that when executed cause the processor to:
acquire an initial gain map with the anti-scatter grid;
compute an initial image of the anti-scatter grid: and
apply a plurality of transformations to the initial image of the anti-scatter grid to generate a plurality of transformed images of the anti-scatter grid.

14. The system of claim 13, wherein the processor is further configured with instructions in the non-transitory memory that when executed cause the processor to:
acquire an initial gain map without the anti-scatter grid; and
generate the plurality of transformed gain maps based on the plurality of transformed images of the anti-scatter grid and the initial gain map without the anti-scatter grid.

15. A method, comprising:
acquiring, with an x-ray detector, an x-ray image of a subject;
identifying at least one region of interest in the x-ray image;
correcting each region of interest of the at least one region of interest with a plurality of transformed gain maps to generate a plurality of corrected regions of interest for each region of interest;
computing, for each region of interest of the at least one region of interest, a corrected region of interest of the plurality of corrected regions of interest with minimized artifacts caused by an anti-scatter grid;
outputting a corrected image comprising the corrected region of interest selected for each region of interest; and
acquiring an initial image of the anti-scatter grid, identifying at least one grid region of interest corresponding to the at least one region of interest in the x-ray image, and applying a plurality of transformations to the at least one grid region of interest to generate a plurality of transformed grid regions of interest for each grid region of interest of the at least one grid region of interest;
wherein the plurality of transformations comprise a plurality of translations, wherein the plurality of transformations transform a position of the anti-scatter grid relative to the x-ray detector in the at least one grid region of interest; and
wherein the at least one region of interest in the x-ray image comprises at least two regions of interest including a first region of interest and a second region of interest, wherein the corrected image comprises a first corrected region of interest for the first region of interest and a second corrected region of interest for the second region of interest, and wherein a first transformation of the plurality of transformations for obtaining the first corrected region of interest is different from a second transformation of the plurality of transformations for obtaining the second corrected region of interest.

* * * * *